United States Patent [19]

Josten

[11] 3,938,788
[45] Feb. 17, 1976

[54] APPARATUS FOR THE PRODUCTION OF METALS BY A SMELTING METALLURGICAL PROCESS

[75] Inventor: Franz Josten, Duisberg, Germany

[73] Assignee: Fried. Krupp Huttenwerke AG, Bochum, Germany

[22] Filed: Dec. 9, 1974

[21] Appl. No.: 531,023

[30] Foreign Application Priority Data
Feb. 2, 1974 Germany............................ 2405038

[52] U.S. Cl..................... 266/13; 98/115 R; 266/16
[51] Int. Cl.²......................................... C21C 5/40
[58] Field of Search..... 55/385; 98/115 R, 115 VM, 98/115 FV; 110/125; 122/7 A; 266/13, 15, 16; 75/60, 59; 13/1, 9

[56] References Cited
UNITED STATES PATENTS
2,803,450  8/1957  McFeaters....................... 266/15 X
3,743,264  7/1973  Baum et al........................ 266/15 X
3,791,636  2/1974  Anderson............................ 266/13

Primary Examiner—Gerald A. Dost
Attorney, Agent, or Firm—Burgess, Dinklage & Sprung

[57] ABSTRACT

An improvement in an apparatus for the production or refinement of metals comprising a furnace and a hood disposed thereover, which improvement comprises an upper chamber surrounding the sides and the top of said furnace, said upper chamber having at least one chamber side wall, said wall having a first movable door therein, a runway disposed within said chamber and partially out of said chamber, a charging crane disposed on said runway having disposed on one side thereof a second movable door movable therewith, means connected to said charging crane for moving said first movable door to permit entry of said charging crane, the size of said first and second movable doors being such as to substantially occupy the entire entrance way to said upper chamber.

12 Claims, 4 Drawing Figures

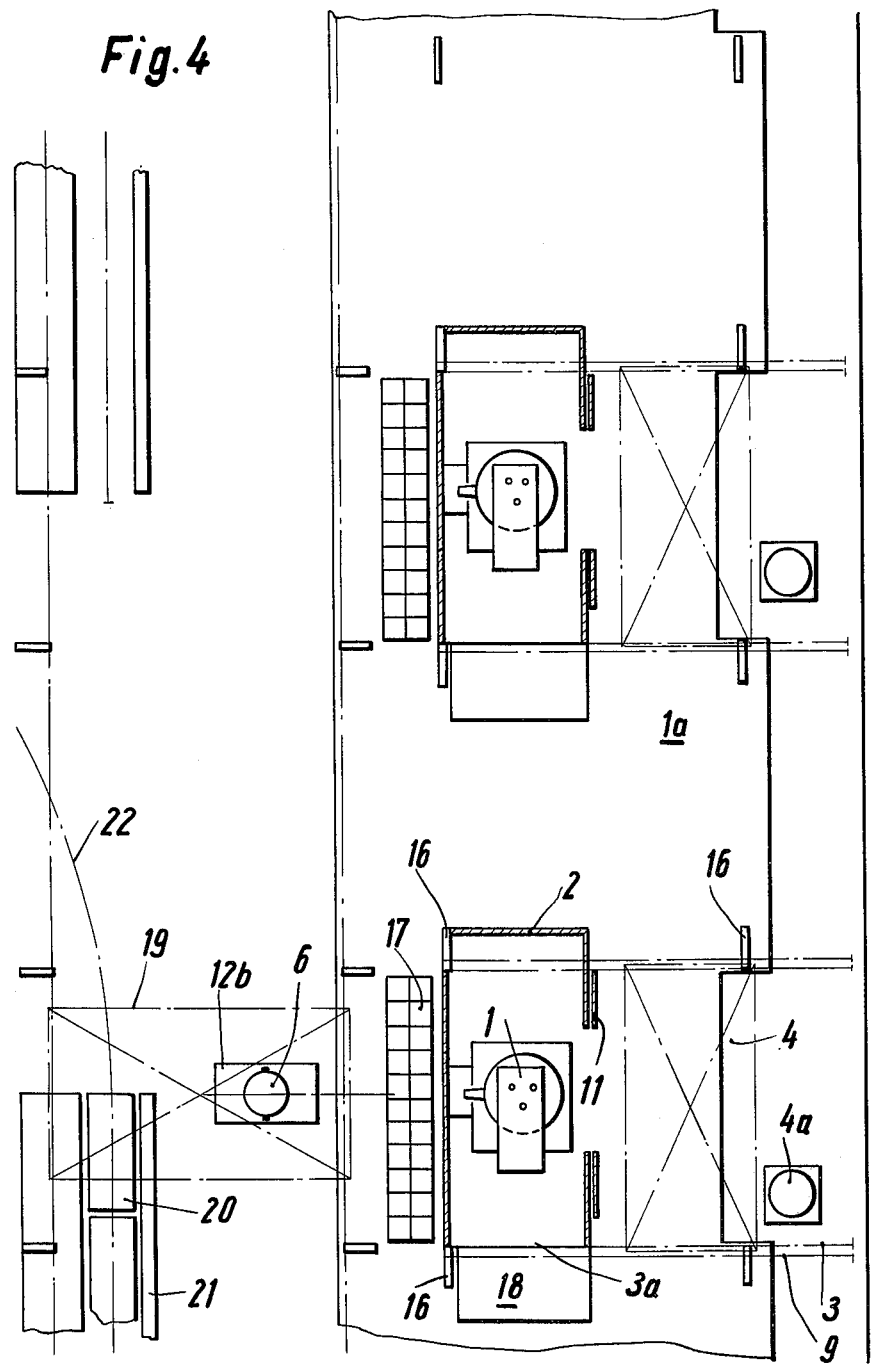

APPARATUS FOR THE PRODUCTION OF METALS BY A SMELTING METALLURGICAL PROCESS

BACKGROUND OF THE INVENTION

1. Field of the Invention

This invention relates to a construction disposed over a smelting furnace, e.g., an electric arc furnace, whereby air pollution due to dust and other particles is eliminated from the balance of the plant. This invention is particularly directed to an apparatus wherein means are provided for removing dust associated with a metal production or refinement operation and means are also employed for providing sound insulation. This invention is particularly directed to an enclosed smelting furnace having an upper chamber and a lower chamber disposed over said smelting furnace, said upper chamber having at least one wall having a movable door, a runway disposed partially within said upper chamber and partially out of said upper chamber, said runway carrying a charging crane. Attached to the charging crane is a second door member which is movable therewith whereby the doors can be moved in unison with one another along the path of the runway in the tapping direction whereby to insure that there is a minimum amount of air movement during the charging operation.

DISCUSSION OF THE PRIOR ART

It is known in the production of metals by a smelting metallurgical process that a substantial amount of dust becomes entrained in the atmosphere. For example, it is known to dispose a hood above the furnace for purposes of dust removal. However, this hood can only collect a certain percentage of the dust which occurs in the atmosphere especially during the charging operation. In particular, the dust resulting from charging or tapping finished steel and from the slag removal is not collected. In connection with blast converters, in order to overcome these difficulties, it has been suggested that the entire working platform together with the converter be screened by a separating wall from the remaining part of the workshop, and that the screened-off portion be connected to an isolated dust removed device. Such a construction is suggested in German Offenlegungsschrift 2,155,537. However, such a solution is quite expensive in terms of the amount of materials and time required for the construction of such a separating wall. Moreover, the use of such an operating wall does not provide any noise insulation for operating personnel who are also subjected to other forms of contamination.

Another solution to such problem is discussed in German Offenlegungsschrift 2,233,443. Therein, it is suggested to encircle only the converter vessel with a hood which extends to the floor. Dust removal is effected by a suction apparatus when tapping or charging the pig iron. For this, an isolated suction pipe is required. This device is particularly unsatisfactory when charging the furnaces, as the quantities resulting thereby cannot effectively be removed.

It is an object of this invention, therefore, to provide an apparatus which during the entire steel production results in effective removal of plant stresses, notably dust and dirt in the atmosphere and noise, while permitting full accessability of the smelting vessel at all times.

It is another object of this invention to provide a construction with which the dust removal device is only charged with controllable volumes of air, thereby providing efficient dust removal. As a large volume of dust and noise result in electric arc furnaces, it is a particular object of the invention to provide a construction for an electric arc furnace which is a relatively uncomplicated and simple unit and which does not provide distractions to operating personnel. A special object is to provide a construction about an electric arc furnace which substantially reduces noise and air pollution.

SUMMARY OF THE INVENTION

The objects of this invention are provided in an apparatus for the production or refinement of metals, which apparatus comprises a furnace and a hood disposed thereover. The apparatus is improved, according to the invention, by providing an upper chamber which surrounds the top and the sides of the furnace, the upper chamber having at least one chamber side wall, said wall having a first movable door therein, a runway disposed partially within said chamber and partially out of said chamber, a charging crane disposed on said runway having disposed at one end thereof a second movable door movable therewith, means connected to said charging crane for moving said first movable door to permit entry of said crane, the size of said first and second movable doors being such as to substantially occupy the entire entrance way to said upper chamber.

In accordance with the present invention, there is provided a device which will also deaden sound created during the charging and slagging operations employed in connection with the metal production or refinement while also allowing for maximum dust removal. The smelting furnace is employed in connection with a tap ladle and a slag bucket. The upper portion of the furnace is surrounded by an upper chamber which surrounds the side wall and the top of the furnace. The furnace is supported on a furnace platform beneath which is a lower chamber which surrounds the lower portion of the furnace. Disposed in the lower chamber is a tap ladle and a slag bucket, each of which is disposed on a transport car. In the upper chamber, there is a wall having a movable door therein through which doorway or entranceway, there is disposed a runway on which a charging crane is movable. The movable door on the upper chamber is movable to permit entrance of the charging crane. The charging crane itself carries a similarly sized doorway which can be disposed in the entranceway after it has entered the upper chamber whereby to seal the same again so that dust does not escape during the charging operation. Thus, the charging crane is movable on the runway in the tapping direction, the crane runway running within the upper chamber disposed over the smelting furnace.

According to the invention, there is provided a construction having a hood and a lower chamber. The upper and lower chambers are functionally regarded as a single unit so that the entire complex of the furnace is screened off from the remaining portion of the workshop. The cells or chambers are so arranged that there is such a distance from the smelting unit that adequate air accessability is guaranteed within the chamber during the charging operation. As atmospheric air can only enter the interior of the upper chamber in controllable quantities, the dust removal apparatus must only handle relatively small volumes of air. Since only relatively small volumes of air are involved, good dust removal is guaranteed.

In a particularly desirable embodiment of the present invention, there is provided a lower chamber which is built as a wall passing through the furnace platform to the floor of the workshop. The furnace platform rests on supports disposed exteriorly and separately interiorly of the cell. The hood can be guided with overlapping walls over the solid chamber masonry so that with this construction the furnace is sealed particularly tight from the remaining workshop. In order to attain sufficient soundproofing, it is recommended that the hood be made of a sound insulating material, e.g., formed sandwich-like from sheets of metal having glass wool therebetween. It is to be understood that each smelting furnace in a plant has its own charging crane, which charging crane runs in the region of the smelting furnace within an upper chamber disposed over the smelting furnace. This upper chamber has doors which can again be shut after the charging crane has entered. With this construction, efficient soundproofing and efficient dust removal are guaranteed at almost all steps in the metal production.

In the construction of the invention, the charging crane travels into a compact chamber. In a preferred construction for the passage of the charging bucket under the crane runway, the cell has a door which can be moved when charging. In the region of the crane runway, the cell has another or second door which shuts the cell and is movable in the crane runway direction both in front of and behind the crane.

In a particularly preferred and exemplified embodiment, doors are movable in the crane runway direction and can be moved on a separate runway arranged above the first-mentioned crane runway. When moving, the charging crane then pushes the door, shutting the cell in front of it, and the second door again shuts the cell backwards after entry. This procedure can be executed automatically by couplings. In a particularly preferred solution, the charging crane is unmanned and controlled externally from an operating platform which simultaneously supervises the entire smelting procedure. In order to be able to supervise the smelting procedure visibly, the cell has a glass window in the region of the operating platform.

In order to avoid the harmful environmental effects during the entire metal production process, the lower chamber has a tap ladle and a slag bucket therein employed during the tapping operation. According to a preferred embodiment of the invention, the tap ladle and slag bucket are movable under the furnace platform on transporter cars in the tapping direction and in the tapping position are surrounded by the walls of the lower chamber. For the passage of the transport cars, the lower chamber has apertures therein which can be closed by doors. In one embodiment, these doors are movable parallel to the cell walls. In another desirable alternative, the doors are arranged at the endway from the furnace on transport cars. In this case, the apertures are desirably tunnellike so that a certain mobility of the transport cars is guaranteed in the tapping position without impairment to the efficient dust removal and soundproofing.

For the inlet of air, the upper cell can have controllable ventilation apertures. By this means one can regulate the temperature in the upper furnace without introducing unnecessary quantities of air which might impair the dust removal operation.

The structural unit on which the charging crane rests is table-like, having four generally vertical supports disposed above the smelting furnace. This table-like construction can be assembled at low construction costs to provide a structural unit for carrying the charging crane which is completely autonomous to the smelting furnace. The tablelike construction preferably includes a storage bunker and, if necessary, the roof of the workshop so that essential parts of the steel works are borne by a simple construction. This has the advantage that the structural unit can be prefabricated with standard parts and can be assembled without difficulty. The construction according to the invention, therefore, offers the possibility of prefabricating essential components of the invention without affecting the smelting furnace assembly. Moreover, the table-like construction can be easily connected to pre-established metal refining plants.

BRIEF DESCRIPTION OF DRAWINGS

The invention can be more readily understood and appreciated when reference is made to the accompanying drawings in which:

FIG. 4 is an aerial plan view of an installation having a plurality of electric arc furnaces.

DESCRIPTION OF SPECIFIC EMBODIMENTS

Figure 1:
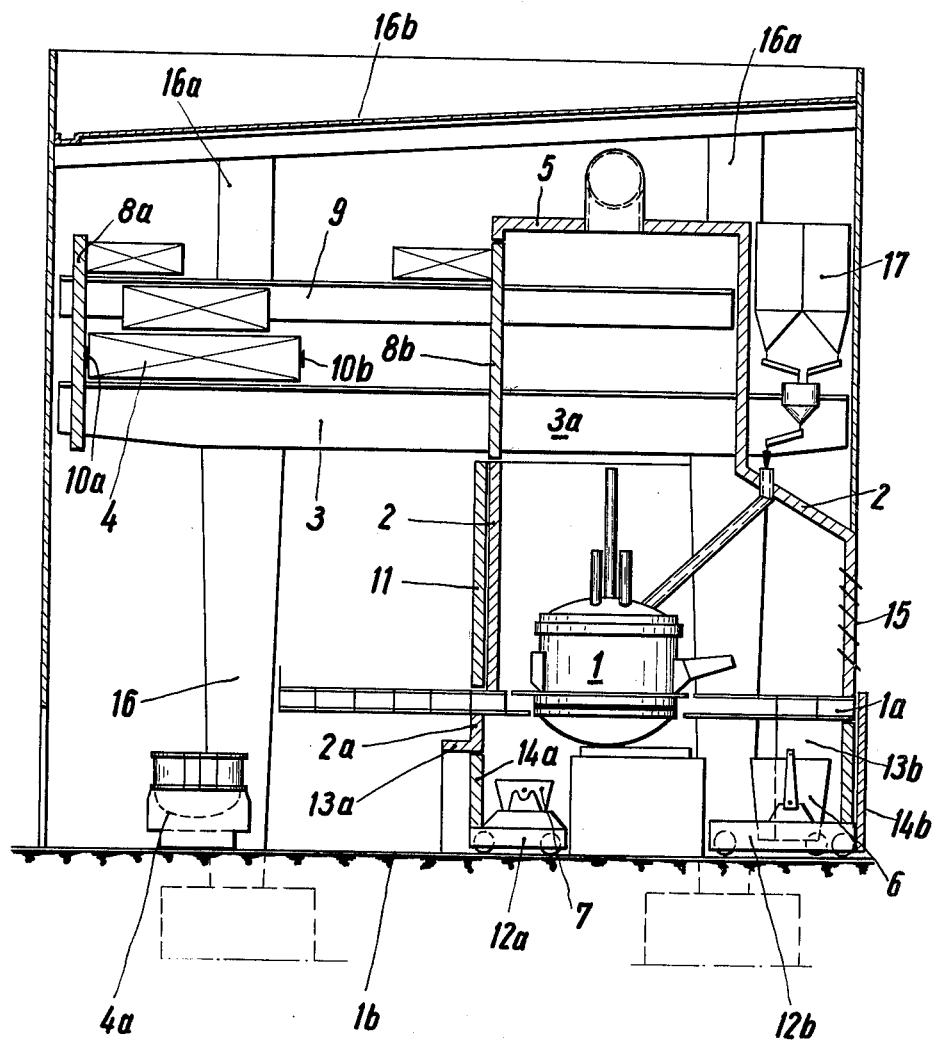
FIG. 1 is a cross-sectional view taken through an installation having an electric arc furnace showing the charging crane disposed out of the upper chamber, i.e., prior to use in a charging operation.
Figure 2:
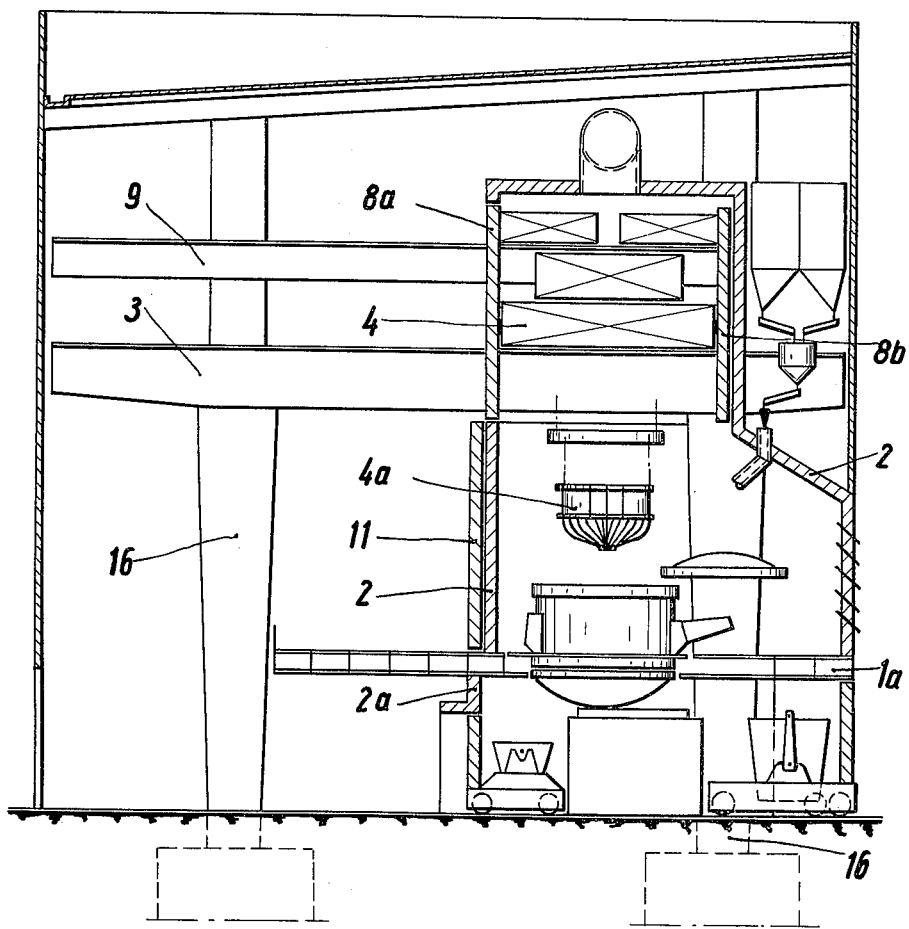
FIG. 2 is a sectional view similar to FIG. 1 showing the crane in the charging position disposed above the electric arc furnace, i.e., within the upper chamber surrounding the electric arc furnace.
Figure 3:
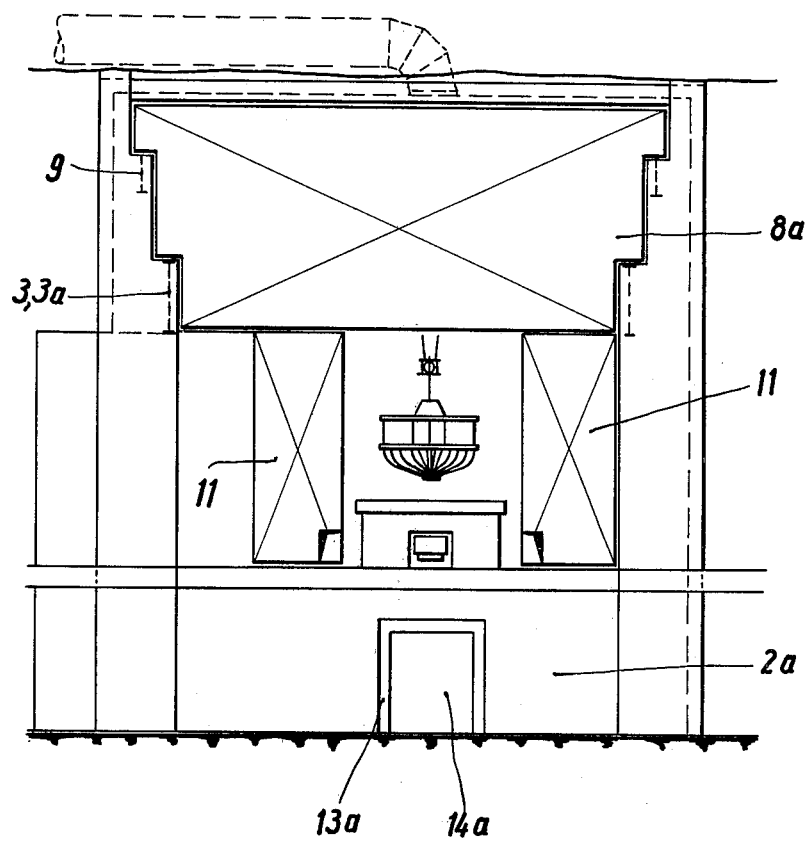
FIG. 3 is a frontal elevation according to FIG. 2.

A specific embodiment of the invention is shown in the accompanying drawings. In FIGS. 1 to 3 there is shown an electric arc furnace 1 having a part 3a of a crane runway 3. Part 3a is disposed within an upper chamber 2 which surrounds the upper portion of a furnace 1. Furnace 1 is supported by a furnace platform 1a beneath which there is disposed a tap ladle 6 and a slag bucket 7. The tap ladle 6 and slag bucket 7 are enclosed by a lower chamber designated by reference numeral 2a, the upper chamber being designated by reference numeral 2, it being understood that they cooperate to form a single compact cell. Part of chamber 2 comprises a hood 5 which is connected to a dust removal device (not shown).

The crane runway 3 and 3a run in the tapping direction, a smaller part 3a of the crane runway being surrounded by the cell 2. In order to enable access of the crane 4 within the chamber 2, the upper chamber has a door element 8b which can be moved in the crane runway direction and which can be connected via a coupling 10b to the crane.

Moreover, at the rearward end of the crane 4 having a coupling 10a, there is arranged a corresponding door element 8a having substantially the same size as door element 8b. Door element 8a adopts the position of door element 8b as seen when one compares FIG. 1 with FIG. 2. The door elements 8a and 8b move on their own runway 9 running parallel and above the crane runway 3.

In order to enable the charging operation, chamber 2 has a door 11 under the craneway 3, 3a which is closed respectivley directly after the entry or exit of the charging bucket 4a or other charging device. The chamber 2 reaches within the lower chamber part 2a through the platform 1a to the workshop floor 1b. The furnace platform 1a inside and outside the chamber stands independently on supports so that the lower chamber part 2a can consist of continuous vertical masonry. The lower chamber part 2a also surrounds the ladle 6 and slag bucket 7 which can be moved in the tapping direction on transport cars 12a or 12b. At the end thereof remote from the furnace, the transport cars 12a and 12b have door elements 14a and 14b which after entry seal apertures 13a and 13b of the lower chamber portion. Therefore, the assembly is constructed to resemble a tunnel. The tunnel-like apertures 13a and 13b guaranty a certain mobility of ladle 6 and slag bucket 7 without impairing the dust removal and soundproofing insulation provided.

The masonry of chamber does not have to reach all the way to the hood. It is preferred that the walls of the upper chamber consist of a soundproofing material constructed sandwich-like, preferably with a material as one containing glass wool. In order to guaranty a largely tight passage between the upper chamber walls and the lower solid masonry 2a, the guiding of the cell walls in a vertical direction slightly overlapping the masonry construction is recommended.

In FIG. 1 there is shown the chamber 2 having controllable ventilation apertures 15. These apertures allow in a controllable manner the entry of a certain amount of air whereby to control the temperature within the upper chamber and to particularly control the temperature of the exhaust gases. In FIGS. 1 and 4 there is shown the crane runway 3 on which the charging crane 4 is disposed. This crane runway 3 is disposed on four generally vertical supports 16. This construction is guided table-like over the electric arc furnace. Next to the crane runway 3, the supports 16 also bear the runway 9 for the wall elements 8a and 8b. Extended support elements 16a support the workshop roof 16b. Moreover, additional bunkers 17 rest at the right-hand end on the extended end of runway 3. The table-like construction gives complete autonomy for this assembly from the furnace. Moreover, each assembly is autonomous from the assembly of another furnace, thereby providing an assembly which can be constructed with low construction cost. The parts required for the table-like construction can be prefabricated away from the site of the steelworks and quickly anchored into the available foundations. The total structural unit can easily be connected to present plant facilities.

In the aerial or plan view of FIG. 4, the operating house 18 is also shown from which the unmanned crane can be visibly driven through a window provided in the chamber 2. For the non-visible positions, additional television cameras can be provided.

On the tapping side of the electric arc furnace 1 there is the casting house having a foundry crane which can travel transverse to the tapping direction, the path of which is arranged above the path 3. The casting house is normally equipped with casting buggies 20 movable on tracks 22 and a pouring platform 21. The casting ladle 6 shown in FIG. 4 is outside the chamber 2 after tapping. After removal of the tapping ladle 6, the transport car 12b can again be driven into the lower chamber. The narrow cell causes a high rate of ventilation in normal dust removal installations as air can only penetrate in controllable quantities. Good soundproofing is guaranteed. Operating personnel are not plagued with dust and dirt particles which escape from the region of the smelting furnace.

The invention is particularly useful in electric arc furnaces where the incidence of dust and noise is particularly high. This is particularly true when scrap contaminated with oil is charged which results in dense smoke in many cases.

As is known, there is also a large incidence of dust development with the use of pig iron or when relining the electric arc furnace with tar-containing dolomite. These impairments are avoided by the construction of the present invention, as during all these activities the region around the electric arc furnace is closed from the remaining workshop. As all the activities can be carried out via the unmanned crane or supervised from outside, the operating personnel are no longer plagued by noise, dust and dirt. A further advantage resides in the fact that each furnace has its own charging crane so that no difficulties can occur in coordinating the charging operation of one furnace with the operations of related furnaces.

What is claimed is:

1. In an apparatus for the production or refinement of metals comprising a furnace and a hood disposed thereover, the improvement which comprises an upper chamber surrounding the sides and the top of said furnace, said upper chamber having at least one chamber side wall, said wall having a first movable door therein, a runway disposed partially within said chamber and partially out of said chamber, a charging crane disposed on said runway having disposed at one end thereof a second movable door movable therewith, means connected to said charging crane for moving said first movable door to permit entry of said charging crane, the size of said first and second movable doors being such as to substantially occupy the entire entrance way to said upper chamber.

2. An apparatus according to claim 1 wherein said furnace is provided with a lower chamber having walls encircling the bottom of said furnace, said upper chamber and said lower chamber separated by a furnace platform.

3. An apparatus according to claim 2 wherein at least the walls of said upper chamber are made of a sound-deadening material.

4. An apparatus according to claim 3 wherein the walls of said lower chamber have a pair of openings therein, closed by doors, said lower chamber having a slag bucket transport car and a tap ladle transport care therein, said slag bucket transport car carrying a slag bucket, said tap ladle transport car carrying a tap ladle.

5. An apparatus according to claim 4 wherein the walls of the upper chamber have variable sized openings for air entry.

6. An apparatus according to claim 4 wherein said charging crane is supported on four generally vertical supports and is guided table-like over said furnace.

7. An apparatus according to claim 1 wherein said means connected to said charging crane for moving said first movable door comprises a coupling, said first movable door having means thereon for engagement with said coupling.

8. An apparatus according to claim 1 wherein said furnace is an electric arc furnace.

9. An apparatus according to claim 2 wherein said lower chamber has a wall passing through the said furnace platform to a workshop floor, said furnace platform resting on supports disposed inside and supports disposed outside said chamber.

10. An apparatus according to claim 4 wherein the doors in said lower chamber are movable parallel to the walls of said lower chamber.

11. An apparatus according to claim 4 wherein each of said transport cars has attached thereto a door element.

12. An apparatus according to claim 4 wherein said first and second movable doors are carried on a door runway disposed over the runway on which said charging crane is disposed.

* * * * *